United States Patent Office 2,971,349
Patented Feb. 14, 1961

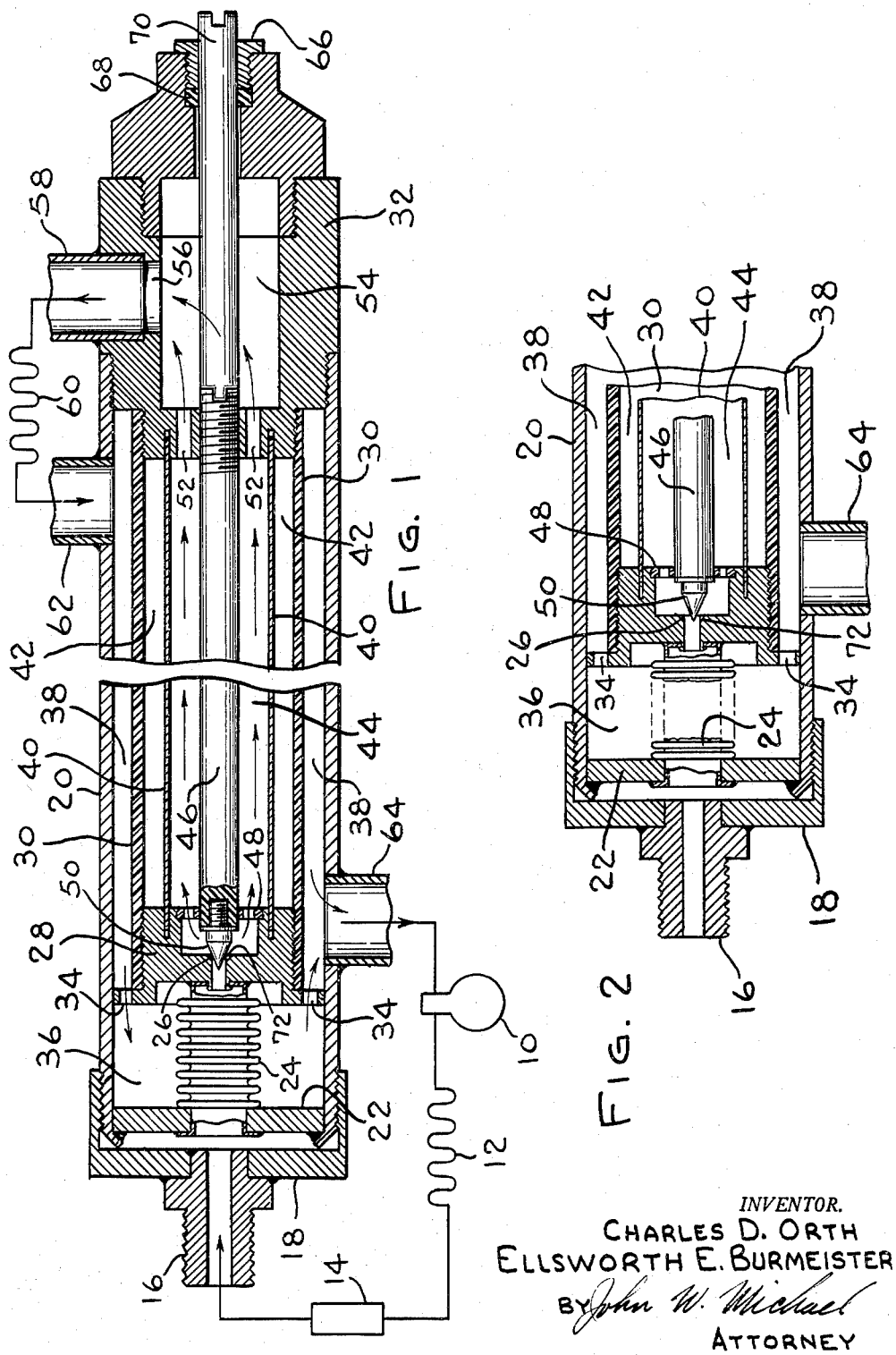

2,971,349

TEMPERATURE DIFFERENTIAL VALVE

Charles D. Orth, Cedarburg, and Ellsworth E. Burmeister, Milwaukee, Wis., assignors to Controls Company of America, Schiller Park, Ill., a corporation of Delaware Filed Dec. 23, 1957, Ser. No. 704,685

6 Claims. (Cl. 62—214)

This invention relates to an expansion valve for refrigeration and air conditioning systems and particularly to an expansion valve which eliminates the customary feeler bulbs or charged elements of any kind.

The principal object of this invention is to eliminate a charged element of any type in an expansion valve.

Another object is to provide a temperature differential responsive expansion valve for refrigeration or air conditioning use.

Still another object is to provide a rugged expansion valve which has no exposed weak parts such as capillary tubes.

Another object is to reduce the cost of expansion valves by eliminating the charged element which is both costly and troublesome to manufacture.

Other objects and advantages will be pointed out in, or be apparent from, the specification and claims, as will obvious modifications of the single embodiment shown in the drawings, in which:

Figure 1 is a section through a representative valve with the refrigeration system shown schematically; and Figure 2 is a fragmentary portion of Figure 1 showing the valve open.

Compressor 10 delivers refrigerant to condenser 12 which delivers to receiver 14 connected to inlet fitting 16 mounted in cap 18 threaded on the cylindrical outer valve body 20. Apertured plate 22 is soldered in the end of body 20 and supports one end of bellows 24 through which refrigerant flows to valve seat 26 in plate 28. Plate 28 is slidable inside body 20 and has threaded thereto a nylon sleeve 30 the other end of which is threaded to plug like fitting 32 threaded in the other end of the body 20. Plate 28 has a plurality of apertures 34 affording communication between the space 36 around bellows 24 and the space 38 between the sleeve and the body. The plate 28 could be square, if desired, and serve the same functions.

Coaxial with sleeve 30 is a tube 40 the ends of which slidably fit in grooves in plate 28 and plug 32 to define a "dead" space 42 between the tube and sleeve. The dead space 42 need not be sealed but is employed only as a form of insulation between space 38 and the central space 44 in which valve stem 46 is mounted. Stem 46 threads in plug 32 and is piloted for sliding movement in the central aperture of spider 48. Valve 50 is carried by the stem and when moved off seat 26 allows flow through the holes in spider 48 to space 44 along the stem and through holes 52 in plug 32 to chamber 54.

Refrigerant flows from chamber 54 through outlet 56 to conduit 58 leading to the evaporator 60. After passing through the evaporator the refrigerant returns through conduit 62 to space 38 outside the nylon sleeve for flow over the sleeve to outlet conduit 64 which is the compressor suction line. The valve stem 46 and the sleeve are of the same material—nylon in this case. Refrigerant flowing to the evaporator is colder than that returning from the evaporator and, therefore, the stem and sleeve are subjected to a temperature differential. This differential is insured by the insulating space 42. When the sleeve 30 is hotter than the stem the sleeve expands and moves plate 28 to the left to move seat 26 away from the valve 50. The differential required to open the valve can be adjusted by adjusting stem 46 in plug 32 by loosening nut 66 to relieve packing 68 and turning the slotted pin 70 protruding from cap threaded in plug 32. The valve may be adjusted to maintain a desired superheat (temperature differential) in the refrigeration system. When adjusted, the valve will open to admit more flow if the evaporator outlet temperature differential over inlet temperature exceeds the pre-set value.

After a long shut-down the outlet and inlet temperature may be the same and the valve could not open under such circumstances. To prevent this, a bleed hole 72 is cut in valve seat 26 so the valve can not, in effect, close all the way. Upon starting then the differential will increase as the compressor pulls the system down. When this happens the valve will open due to temperature differential and operation thereafter proceeds in the normal way.

The fundamental concept here is to utilize the expansion difference to actuate the valve. As this concept is evolved different structural appearance will be taken in all likelihood. Therefore, this invention is to be limited only by the scope of the claims.

We claim:

1. A valve comprising, a body having an inlet and an oulet with a flow path therebetween, a valve seat member in the flow path, flexible conduit means connecting the inlet to the seat member, the seat member being movable in the body, a valve member cooperating with the seat member to regulate flow to the outlet, temperature responsive means in the flow path downstream of the valve member and connected to one of the members to actuate it in accordance with temperature change, a second flow path through the valve body and including an inlet and an outlet, temperature responsive means in the second flow path connected to the other of said members to actuate it in accordance with temperature change.

2. A valve according to claim 1 in which the body is generally cylindrical and the second temperature responsive means is in the form of a coaxial sleeve within the body anchored at one end to the body and at its other end to its associated member, the second flow path being between the sleeve and the body, the first temperature responsive means being anchored to the body within the sleeve in the first flow path, and means insulating the sleeve from the first flow path.

3. A valve comprising a body having an inlet and an outlet, a valve member and a valve seat member in the flow path between the inlet and the outlet, the outlet being adapted for connection to a refrigeration evaporator, the body also having a second flow path therethrough for fluid flowing from the evaporator and including an inlet and an outlet, a closed chamber which insulates the first and second flow paths from each other, expandable means positioned in the first flow path downstream of the valve and connected to one of said members, expandable means in the second flow path and connected to the other of said members, said members being movable by the expandable means.

4. A valve according to claim 1 in which the valve seat member has a seating surface provided with bleed passages.

5. A valve comprising, a body having an inlet and an outlet interconnected by a first flow path, a second inlet and a second outlet in the body interconnected by a second flow path, a valve member and a valve seat member in the first flow path for regulating flow to the first outlet, means expandable with temperature positioned in the first flow path downstream of the valve member and connected to one of said members, means expandable with temperature positioned in the second flow path and connected to the other of the members, both members being movable with respect to the body and with respect to each other, said first inlet connected to the seat member by flexible means and both expandable means expand the same amount in response to the same temperature change whereby the valve acts to maintain a predetermined temperature differential between the flow paths.

6. The combination with a refrigeration system of the compressor, condenser, evaporator type, of an expansion valve regulating flow to the evaporator comprising, a body having an inlet and an outlet with a flow path therebetween, the outlet being connected to the evaporator inlet, a valve seat member movable with respect to said body and a valve member in said flow path and movable with respect to both said body and said valve seat, first temperature responsive means connected to one member and responsive to valve outlet temperature, second temperature responsive means connected to the other member and responsive to evaporator outlet temperature, both members being actuated in accordance with the temperature of their associated temperature responsive means to maintain a predetermined temperature differential between the valve outlet and the evaporator outlet, the valve body having a second flow path therethrough, refrigerant flow from the evaporator outlet to the compressor inlet passing through said second flow path, said second temperature responsive means being located in said second flow path in said body.

References Cited in the file of this patent

UNITED STATES PATENTS 2,241,931     Potter _____ May 13, 1941